Patented Nov. 11, 1930

1,781,607

UNITED STATES PATENT OFFICE

FRANK F. STAMBERG, OF CICERO, ILLINOIS, ASSIGNOR TO STANDARD OIL COMPANY, OF WHITING, INDIANA, A CORPORATION OF INDIANA

DRAWING LUBRICANT

No Drawing.   Application filed August 12, 1927.   Serial No. 212,847.

This invention relates to drawing lubricants and particularly to drawing lubricants containing green acid soaps, mineral oil and colloidal clay.

The green acid soaps are the alkali metal or ammonium salts of the preferentially water soluble sulphonic acids produced by the treatment of heavy hydrocarbon oils with fuming sulfuric acid and separated from the sludge layer as described in Patent No. 1,474,933, granted November 20, 1923 to Humphreys and others, or in any other suitable manner.

The mineral oil is preferably a distillate lubricant oil of relatively low viscosity. Straw oil is suitable.

The colloidal clay may suitably be wilkinite, bentonite, or other suitable colloidal clay.

The composition may, if desired, include other materials, such as animal fats, other soaps and preservatives. For example, the compound may include tallow, lard, or other animal fats, or fatty oils.

As examples of other soaps, which may be included, I may refer to mahogany soaps, which are the preferentially oil soluble sulphonates of the alkali metals produced by adding a small quantity of alkali to acid treated petroleum oil after withdrawal of sludge, and extracting with dilute alcohol or acetone, or in any other suitable manner. Another suitable soap is naphthenic soap, derived from mineral oil. The naphthenic soaps may be produced by treating lubricant distillate from coastal crudes or other crudes which contain naphthenic acids, with alkali and extracting with alcohol, or in any other suitable manner.

A small quantity of a deodorant may be included in the mixture. For example, between 0.1 and 1% of pine oil is suitable.

The composition of the present invention is preferably prepared in the form of a concentrated emulsion which is capable of dilution with water to a considerable degree to provide a dilute emulsion suitable for use in drawing and die-pressing. Such concentrated emulsion may suitably contain green acid soap 1 to 20%, colloidal clay 1 to 50%, mineral oil 1 to 50%, and water 1 to 50%.

As a specific example of a concentrated emulsion of this type, the following is given:

|  | Per cent |
|---|---|
| Green acid soap | 16 |
| Straw oil | 34 |
| Wilkinite | 35 |
| Water | 15 |

Where animal fat and other soaps are employed, the composition of the concentrated emulsion may suitably contain green acid soap 1 to 10%, mineral oil 3 to 40%, colloidal clay 10 to 40%, animal fat 1 to 30%, other soaps 2 to 20%, and water 1 to 75%.

As a specific example of such a composition, the following is given:

|  | Per cent |
|---|---|
| Green acid soap | 6 |
| Straw oil | 22 |
| Wilkinite | 25 |
| Tallow | 15 |
| Mahogany soap | 10 |
| Water | 22 |

About 0.25% of pine oil may be added as a deodorant.

These compounds may be readily emulsified by passing through a colloid mill or centrifugal pump, to yield concentrated emulsions which can be readily diluted with water to give dilute emulsions of remarkable permanence and suitable for use as lubricants in drawing and die-pressing.

Although the present invention has been described in connection with the details of certain specific examples, it is not intended that such details shall be regarded as limitations upon the scope of the invention except in so far as included in the accompanying claims.

I claim:

1. An emulsified composition comprising oil, green acid soap, colloidal clay, and water.

2. An emulsified composition comprising oil, green acid soap, wilkinite, and water.

3. An emulsified composition adapted to be readily diluted with water to yield emulsions suitable for use as drawing lubricants, comprising green acid soap, mineral oil, animal fat, colloidal clay, mahogany soap and water.

4. An emulsified composition adapted to be readily diluted with water to yield emulsions suitable for use as drawing lubricants, comprising green acid soap 6%, straw oil 22%, wilkinite 25%, tallow 15%, mahogany soap 10% and water 22%.

In witness whereof, I have hereunto set my hand, this 15 day of July, 1927.

FRANK F. STAMBERG.